Aug. 5, 1958  H. A. BIRKNESS ET AL  2,846,143
MECHANICAL CALIBRATION CHART
Filed Dec. 30, 1954  2 Sheets-Sheet 1
Fig. 1.
Fig. 2.
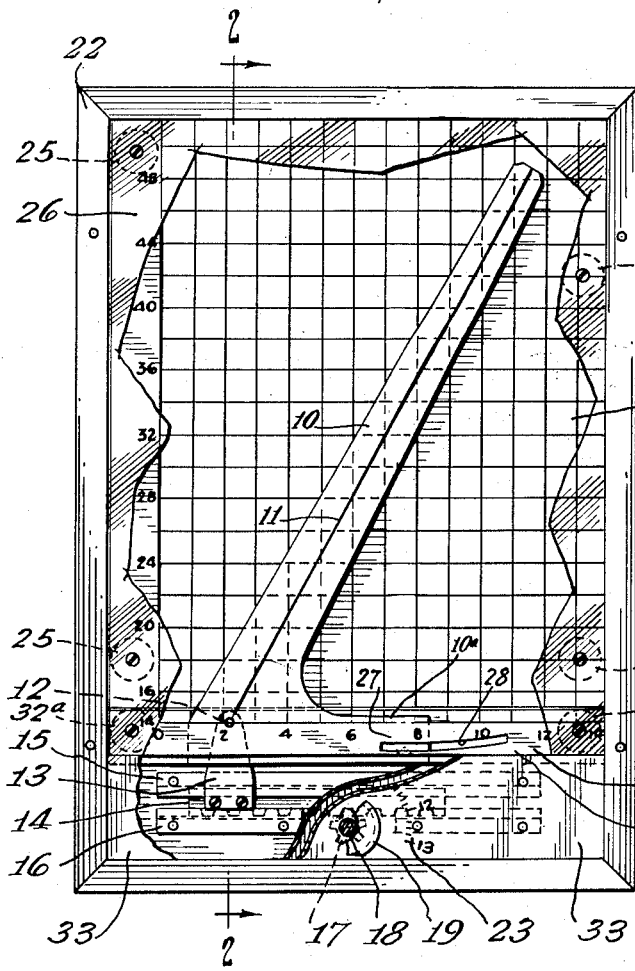
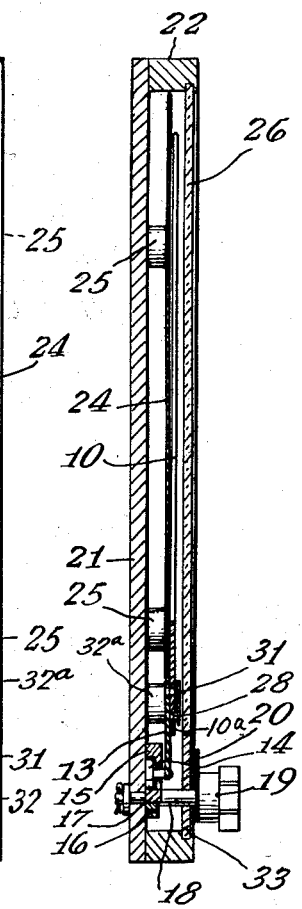
INVENTORS.
Harald A. Birkness
Joseph C. Rhodes
BY
Everett A. Johnson
attorney Aug. 5, 1958  H. A. BIRKNESS ET AL  2,846,143
MECHANICAL CALIBRATION CHART
Filed Dec. 30, 1954  2 Sheets-Sheet 2
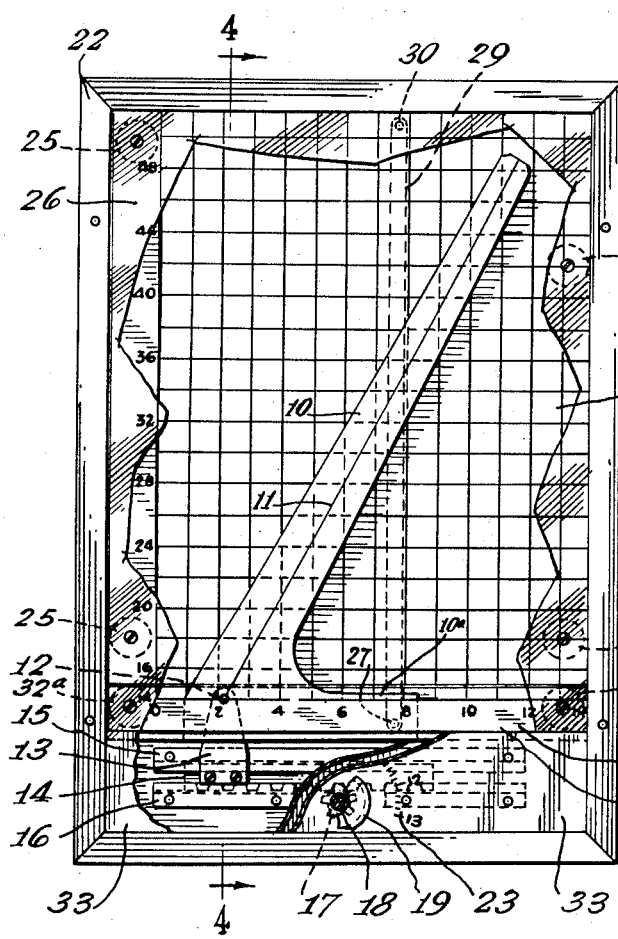
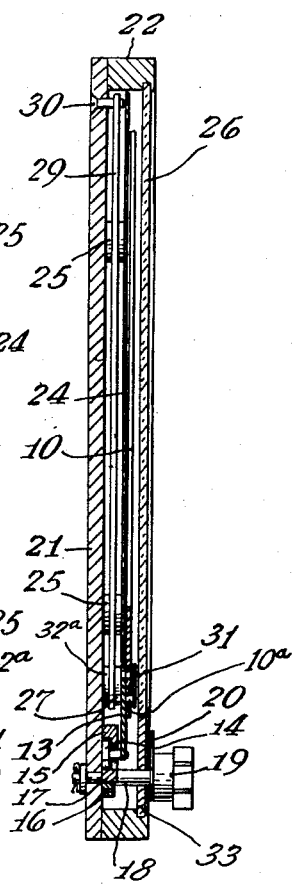
INVENTORS.
Harald A. Birkness
Joseph C. Rhodes
BY
Everett A. Johnson
Attorney United States Patent Office 2,846,143
Patented Aug. 5, 1958

2,846,143

MECHANICAL CALIBRATION CHART

Harald A. Birkness, Homewood, and Joseph C. Rhodes, Park Forest, Ill., assignors to Standard Oil Company, Chicago, Ill., a corporation of Indiana Application December 30, 1954, Serial No. 478,758

6 Claims. (Cl. 235—61)

This invention relates to an apparatus to be used in place of a family of curves on a calibration chart or graph.

Heretofore, a graph containing a family of, say six, curves required skilled interpretation and interpolation. The curves were frequently difficult to read and, in general, the accuracy and reproducibility of the calibration depended upon the skill of the personnel.

It is an object of our invention to provide an apparatus which replaces a calibration graph containing a family of curves with one mechanically movable curve which, within the range, can be positioned infinitely in accordance with the parameter. Another object of the invention is to provide a mechanical means whereby calibrations can be made with reference to a chart without previous special skill. An additional object is to provide a system whereby a graph containing a family of curves is replaced with a single curve which can be easily read in a large number of positions. A further object of our invention is to provide an apparatus which eliminates clutter, makes the curve easier to read, and obviates interpolation. Other objects of the invention will become apparent to those skilled in the art as the description thereof continues.

Briefly, in accordance with our invention, we invention, we provide a chart which is calibrated both as to ordinate and abscissa, but contains no curve. Over the graph we provide a transparent blade containing the curve. The blade is pivoted at one point and the point is translatable along the abscissa. The blade is also pivoted at a second point, the second point being rotatable and translatable so as to swing the blade over the chart in accordance with the chosen parameter. To make a calibration, the desired translation of the blade is selected by suitable means and a curve then falls on the chart in the desired position and the ordinate reading is made in the ordinary way.

Further details of the construction and operating technique will be described in connection with the accompanying drawings wherein:

Figure 1 is a plan view, partly in section, of our device;

Figure 2 is a sectional elevation taken along the line 2—2 in Figure 1;

Figure 3 is a plan view, partly in section, of a modification of our device; and Figure 4 is a sectional elevation taken along the line 4—4 in Figure 3.

Referring to the drawings, wherein two embodiments of the invention are shown, a transparent blade 10, having a base 10a and a hair line or curve 11, is mounted for movement about pivot 12. The pivot 12 is supported by an arm 13 which is fixed to a translatable rack 14 which moves within the rack guides 15 and 16. A pinion 17, mounted on shaft 18 which is provided with a knob 19 having a pointer 20, engages the rack 14 so as to cause the pivot 12 to translate a distance corresponding to that selected according to the dial or scale 23 on which the pointer 20 moves.

In the embodiment of Figures 1 and 2, the outer end of the base 10a supports a guide pin 27 which moves within the slot 28 thereby causing the blade 10 to rotate about the pivot 12 when said pivot 12 is moved laterally when turning the knob 19.

The rack guides 15 and 16 are fixed to a back plate 21 which is enclosed by a frame 22 having a transparent cover 26. A co-ordinate sheet 24 is mounted within the frame 22 on sheet supports 25. In a preferred embodiment, the sheet 24 is made of etched aluminum and is self-supporting. However, a separable co-ordinate sheet may be mounted on a bed 24.

The ordinate scale is fixed to the sheet 24 in a conventional manner. However, the abscissa scale 31 and a portion of the co-ordinate sheet are carried by or are integral with a cover plate 32 which is supported by spools 32a and is spaced above the sheet 24 a distance sufficient to accommodate therebetween the base 10a of the blade 10 and the pivot support arm 13. This cover plate 32 also comprises the guide slot 28 which receives the pin 27.

In Figures 3 and 4, radius arm 29, pivoted at 30 to the back plate 21, is pivotally fixed to the guide pin 27, the length of the radius arm 29 being the radius of curvature of the slot 28.

To design the guide slot 28, the curve 11 in the blade 10 is successively aligned with each of the curves in a family of curves on a convention co-ordinate sheet and the path of the guide pin 27 drawn as the blade 10 is translated from curve to curve. The co-ordinate sheet 24, which may be photographed on an aluminum plate, is calibrated both as to orinate and abscissa but contains no curve.

Immediately above the graph is the transparent blade 10 containing the curve 11 which, in the illustrated example, is a straight line. By turning the calibrated knob 19 and depending on the position and curvature of the designed guide slot 28, the blade 10 containing the curve 11 can be translated and rotated thus changing the X-intercept and the slope.

If desired, the slot 28 can be calibrated for the various positions of the guide pin 27 corresponding to some parameter. Likewise, the guide pin 27 can be provided with grasping means for moving the pin 27 along the guide slot 28 over such a calibrated scale which would correlate with the dial or scale 23. In this event, the knob and pin assembly can be omitted, the translation and rotation of the blade 10 being effected by applying effort directly to the grasping means on the guide pin 27.

The apparatus is completed by an indicia plate 33 which encloses the rack 14 and the rack guides 15 and 16. On this plate 33 information regarding the correlation and operation of the apparatus may be imprinted.

As an example of the operation of the instrument, we may calibrate readings on 158 point with respect to the Reid vapor pressure of a gasoline sample. More specifically, we contemplate utilizing the information obtained from a light ends recorder mechanism such as that described in a co-pending application Serial Number 463,171, filed October 19, 1954 by Robert B. Jacobs, now U. S. Patent 2,811,851.

In that device, the Reid vapor pressure of a gasoline sample is automatically and continuously indicated while simultaneously giving a chart reading which is correlated with the percent off at 158° F., commonly referred to as the "158 point" of the gasoline. However, it has been discovered that the 158 point is sensitive to Reid vapor pressure and, accordingly, it is desired to calibrate the indicated chart reading so as to compensate for the measured Reid vapor pressure of the sample.

Heretofore, for example, it has been necessary to employ a family of Reid vapor pressure curves and more often than not it has been necessary to interpolate between curves. According to our invention, the "chart reading" from the light ends recorder is plotted as the abscissa; the Reid vapor pressure, as indicated by the light ends recorder, is the reading for which the knob 19 is calibrated on scale 23. By setting the proper Reid vapor pressure by means of the knob 19, the curve 11 is properly translated and rotated and the 158 point, plotted as the ordinate, can be read directly for any given chart reading.

Although this device has been described for a specific use and a particular shape of curve, there are other situations where our invention can be used to advantage. For example, in radiography, where log exposure time depends on thickness with kilovolt peak setting on the X-ray machine as the parameter; temperature-viscosity chart with different grades of oil as the parameter; spring design, where the allowable load depends on wire diameter with coil diameter as the parameter; refrigeration, where capacity depends on discharge pressure with suction pressure as the parameter; and, in general, any system normally expressed in a family of curves and where a calibration with respect to a given parameter is desired.

Accordingly, although we have described our invention with respect to a preferred arrangement and a preferred technique of operation, it should be understood that this is by way of illustration only. Modifications in the apparatus and the operating technique are contemplated without departing from the spirit of the invention.

What we claim is:

1. An apparatus for simulating a family of curves which comprises in combination a transparent blade, a curve on said blade, a translatable pivot for said blade, a rack and pinion means supporting said pivot, a guide pin means on said blade remote from said pivot, a guide slot accommodating said guide pin means, and a co-ordinate sheet over which said blade and curve are movable, said sheet being calibrated both as to ordinate and abscissa but containing no curve.

2. An apparatus providing an infinitely adjustable calibration curve comprising in combination a fixed co-ordinate sheet calibrated both as to ordinate and abscissa but containing no curve, a transparent blade translatable and rotatable over said co-ordinate sheet, a curve on said blade corresponding to a desired calibration curve, translatable support means for said blade movable along a line parallel to said abscissa, pivot means for said blade on said support means, a guide means fixed to said blade at a point remote from said pivot means, means associated with said guide means causing said blade to be rotated about said pivot means according to a preselected pattern while being translated, whereby positions of the curve are changed according to a selected parameter.

3. An apparatus for simulating a family of curves which comprises in combination a transparent blade, a curve on said blade, a translatable pivot for said blade, rack and pinion means supporting said pivot, pin means on said blade remote from said pivot, guide means for said pin means, and a co-ordinate sheet over which said blade and curve are movable, said sheet being calibrated both as to ordinate and abscissa.

4. The apparatus of claim 3 wherein said guide means comprises a curved guide slot.

5. The apparatus of claim 3 wherein said guide means comprises a radius arm pivoted to said pin means.

6. The apparatus of claim 2 wherein said means associated with said guide means causing said blade to be rotated about said pivot means according to a preselected pattern while being translated comprises a curved guide slot.

References Cited in the file of this patent

UNITED STATES PATENTS

| Number | Name | Date |
|---|---|---|
| 168,656 | McInnes | Oct. 11, 1875 |
| 990,385 | Pierce | Apr. 25, 1911 |
| 1,074,439 | Kincaid | Sept. 30, 1913 |
| 1,851,744 | Wellington | Mar. 29, 1932 |
| 2,206,760 | Ballard | July 2, 1940 |
| 2,307,534 | Olson | Jan. 5, 1943 |
| 2,699,894 | Hirsch | Jan. 18, 1955 |

FOREIGN PATENTS

| Number | Country | Date |
|---|---|---|
| 49,960 | Sweden | Sept. 18, 1915 |
| 214,919 | Great Britain | May 1, 1924 |
| 580,392 | Germany | July 10, 1933 |
| 634,220 | Germany | Aug. 26, 1936 |